A. L. ROSENE.
CUT-OFF.
APPLICATION FILED MAY 13, 1905.
909,680.
Patented Jan. 12, 1909.
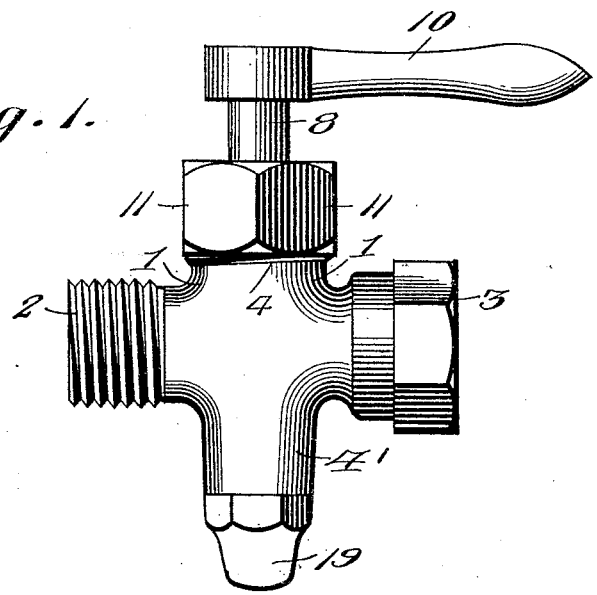
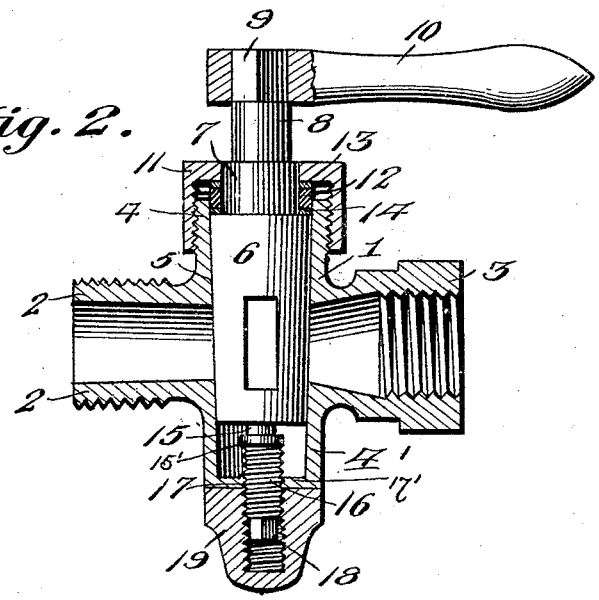
Witnesses
Frank B. Hoffman
C. C. Hines
Inventor
Alfred L. Rosene
By Victor J. Evans
Attorney

UNITED STATES PATENT OFFICE.

ALFRED L. ROSENE, OF ST. LOUIS, MISSOURI.

CUT-OFF.

No. 909,680. Specification of Letters Patent. Patented Jan. 12, 1909.

Application filed May 13, 1905. Serial No. 260,329.

*To all whom it may concern:*

Be it known that I, ALFRED L. ROSENE, a citizen of the United States, residing at St. Louis, in the county of St. Louis City and State of Missouri, have invented new and useful Improvements in Cut-Offs, of which the following is a specification.

My invention has relation to cut-offs such as cocks, faucets, valves and spigots, and it consists in the construction and arrangement of parts as will be hereinafter described and particularly claimed.

The preferred embodiment of the invention is illustrated in the accompanying drawing, in which:—

Figure 1 is a side elevation of a cut-off embodying my invention; and Fig. 2 is a vertical longitudinal section through the same.

Referring now more particularly to the drawing, the numeral 1 represents the casing of the cut-off, which is provided with the usual threaded connections 2 and 3 for attachment to the proximate ends of the pipes of a system to which the cut-off is to be applied. The casing is further provided with an upwardly extending exteriorly threaded neck 4 and a chambered base extension 4'.

The bore 5 of the casing is of the usual tapered form to receive the tapered turn plug 6, which latter is provided with an upwardly extending stem 7 cylindrical in form and provided with a reduced extension 8, the latter terminating in a polygonal head 9 adapted to fit within the correspondingly shaped opening in an actuating handle 10.

The neck 4 is closed by a cap or gland nut 11 having an opening to receive the upper portion of the cylindrical stem 7 and having its flange externally threaded to engage the screw threads of the neck 4, whereby said cap may be adjusted thereon. Between the upper end of the body of the turn plug and the wall or head of the cap is arranged a suitable packing, the same consisting in the present instance of a rubber or other elastic packing ring 12 which surrounds the stem 7 and above and below which are arranged metallic washers or wear plates 13 and 14 which contact with the base of the head of the nut 11 and the upper end wall of the turn plug 6. This packing thus surrounds the stem 7 and engages the inner wall of the bore of the neck 4, so that when the cap 11 is screwed down on the neck the packing will be compressed to closely fit the wall of the bore and the stem of the plug whereby the packing is rendered readily adjustable to compensate for the downward movement of the turn plug 6, when the latter is adjusted in the bore 5 to compensate for wear.

In order to limit the downward movement of the turn plug 6 an adjustable stop 15 with an annulus 15' is provided which is carried by a screw threaded stem 16, said stem being adjustably mounted in a screw threaded aperture 17 in the bottom wall 17' of the base extension 4' and projecting exteriorly therefrom and provided at its lower end with a polygonal head 18 for the reception of a wrench or other tool by which the stem may be adjusted. The projecting lower end of the stem is preferably concealed and protected by the use of a cap nut 19, the bore of which is threaded in such relation to the threads of the stem that the nut may be adjusted thereon without changing the position of the stem. By means of the adjustability of the stem 16, the stop 15 carried thereby may be moved inward or outward to limit the downward movement of the turn plug 6 and to permit of the same being adjusted in a ready and convenient manner to compensate for wear and to adapt the plug to at all times fit the bore of its casing sufficiently tight to prevent leakage. The screw stem 16 is introduced into the casing through the top and extends through the bottom wall 17' of the base extension 4' and serves to limit the downward adjustment of the plug; the stem having the collar 15' thereon which serves to contact with said bottom wall 17' to prevent the stem from passing entirely out of the bottom.

In the ordinary construction of cut-off or stop cock, the turn plug is provided at its lower end with a threaded stem integral therewith and engaged by a tightening nut and washer. When the turn plug is loose this nut is tightened to compensate for wear. This construction and mode of adjustment is, however, objectionable, for the reason that it often strains the plug and renders the same too tight, resulting frequently in a broken stem. When the plug is found to turn with difficulty in the casing the nut is loosened, leaving both ends of the cut-off unprotected from leakage. Cut-offs of this character give a great deal of trouble and annoyance when used in brine pipes of brewery and ice plants, as the turn plug cannot be adjusted after it has become worn to prevent leakage without turning too hard in the casing, and if the nut is loosened to adapt it to turn more freely leakage cannot be avoided. Leakage of the brine from the casing is very deleterious on account of the action of the same on the pipes and fittings of the system.

My invention obviates these objections, as the adjustable stem 16, with the stop carried thereby, permits of the downward adjusting movement of the turn plug to the desired degree without strain thereon and without causing it to bind too tightly within the casing, while the adjustable packing at the upper end of the stem effectually prevents leakage at that point. The cut-off is, therefore, rendered particularly adapted for use in brine systems and any other systems where the fluid medium circulates under pressure. As stated, the packing ring or gasket 12 is preferably made of rubber, the use of this substance being deemed desirable when the cut-off is used in connection with brine plants, but it may be made of asbestos to adapt the cut-off for more effective use in steam pipes.

From the foregoing description taken in connection with the accompanying drawing, it can be seen that means have been provided in a cut-off that produces a freely seated plug and at the same time is effectually packed to prevent leakage without undue pressure, and the packing is thoroughly protected against wear, whereby the necessity of removing the packing ring frequently is obviated.

To insert the plug, drop it into its tapered seat, adjust the screw stem 16 at the bottom to raise the plug slightly from its seat, enough only to prevent binding in the above, place into position the compressible packing member and the wear plates at each side and finally place the screw cap or gland into engagement with the casing, then, by turning the screw cap it gradually compresses the packing ring and forces it into engagement with the stem and the bore of the casing. It will be observed that the screwing down of the cap or gland will not rub or injure the compressible packing and the downward pressure upon the plug is only sufficient to compress the packing into engagement with the stem and bore; the packing is protected upon the other side from the turning of the plug, thereby allowing the plug to turn easily and without undue pressure.

Having thus described the invention, what is claimed as new, is:—

1. A valve comprising a casing, a rotary plug therein, and a screw stem mounted in the casing below the plug and serving to limit the downward adjustment of the plug, said stem carrying a collar to prevent the stem from passing entirely out of the casing bottom, substantially as specified.

2. A valve comprising a casing, a rotary plug therein, and a screw stem mounted in the casing below the plug and serving to limit the downward adjustment of the plug, said stem carrying a collar to prevent the stem from passing entirely out of the casing bottom, and a protecting cap for the stem, substantially as specified.

In testimony whereof, I affix my signature in presence of two witnesses.

ALFRED L. ROSENE.

Witnesses:
JAMES H. HICKS,
JOHN H. ROSENE.